United States Patent
Ida et al.

(10) Patent No.: US 10,391,555 B2
(45) Date of Patent: Aug. 27, 2019

(54) SILVER NANOWIRES, METHOD FOR PRODUCING SAME, AND INK

(71) Applicants: THE UNIVERSITY OF SHIGA PREFECTURE, Shiga (JP); DOWA HOLDINGS CO., LTD., Tokyo (JP)

(72) Inventors: Shohei Ida, Shiga (JP); Yoshitsugu Hirokawa, Shiga (JP); Jeyadevan Balachandran, Shiga (JP); Jhon Lehman Cuya Huaman, Shiga (JP); Kimitaka Sato, Tokyo (JP)

(73) Assignees: THE UNIVERSITY OF SHIGA PREFECTURE, Shiga (JP); DOWA HOLDINGS CO., LTD., Tokyo (JP)

( * ) Notice: Subject to any disclaimer, the term of this patent is extended or adjusted under 35 U.S.C. 154(b) by 94 days.

(21) Appl. No.: 15/542,109

(22) PCT Filed: Jan. 14, 2016

(86) PCT No.: PCT/JP2016/051051
§ 371 (c)(1),
(2) Date: Jul. 7, 2017

(87) PCT Pub. No.: WO2016/114370
PCT Pub. Date: Jul. 21, 2016

(65) Prior Publication Data
US 2018/0272424 A1 Sep. 27, 2018

(30) Foreign Application Priority Data
Jan. 15, 2015 (JP) ................. 2015-006211

(51) Int. Cl.
*H01B 1/02* (2006.01)
*B22F 1/00* (2006.01)
(Continued)

(52) U.S. Cl.
CPC .......... *B22F 1/0044* (2013.01); *B22F 1/0025* (2013.01); *B22F 1/0062* (2013.01);
(Continued)

(58) Field of Classification Search
CPC .... B22F 1/0025; B22F 1/0044; B22F 1/0062; B22F 2001/0066; B22F 2301/255;
(Continued)

(56) References Cited

U.S. PATENT DOCUMENTS

| 2005/0056118 A1 | 3/2005 | Xia et al. | |
| 2007/0249747 A1* | 10/2007 | Tsuji | B82Y 30/00 522/3 |

(Continued)

FOREIGN PATENT DOCUMENTS

| JP | 2014-505963 | 3/2014 |
| WO | 2013/112236 | 8/2013 |

OTHER PUBLICATIONS

S. Sugiyama et al., Journal of Colloid and Interface Science 527 (2018) 315-327 (Year: 2018).*

*Primary Examiner* — Mark Kopec
*Assistant Examiner* — Jaison P Thomas
(74) *Attorney, Agent, or Firm* — Clark & Brody

(57) ABSTRACT

Silver nanowires having a thin and long shape that exhibit excellent dispersibility in an aqueous solvent having an alcohol added thereto are provided by silver nanowires having an average diameter of 50 nm or less and an average length of 10 μm or more, covered with a copolymer of a maleimide-based monomer and vinylpyrrolidone. The silver nanowires can be produced by a method for producing silver nanowires, containing reductively depositing silver in a wire form in an alcohol solvent having dissolved therein a silver compound, the deposition being performed in the solvent
(Continued)

having dissolved therein a copolymer of a maleimide-based monomer and vinylpyrrolidone.

29 Claims, 18 Drawing Sheets

(51) Int. Cl.
| | |
|---|---|
| *B22F 9/24* | (2006.01) |
| *C09C 1/62* | (2006.01) |
| *C09C 3/10* | (2006.01) |
| *C09D 11/52* | (2014.01) |
| *H01B 1/22* | (2006.01) |
| *C09D 11/037* | (2014.01) |
| *C09D 11/106* | (2014.01) |
| *C08K 7/24* | (2006.01) |
| *C08K 9/04* | (2006.01) |
| *C08K 3/08* | (2006.01) |
| *C08K 9/08* | (2006.01) |

(52) U.S. Cl.
CPC .................. *B22F 9/24* (2013.01); *C09C 1/62* (2013.01); *C09C 3/10* (2013.01); *C09D 11/037* (2013.01); *C09D 11/106* (2013.01); *C09D 11/52* (2013.01); *H01B 1/02* (2013.01); *H01B 1/22* (2013.01); *B22F 2001/0066* (2013.01); *B22F 2301/255* (2013.01); *C08K 7/24* (2013.01); *C08K 9/04* (2013.01); *C08K 9/08* (2013.01); *C08K 2003/0806* (2013.01); *C08K 2201/001* (2013.01); *C08K 2201/003* (2013.01); *C08K 2201/004* (2013.01); *C08K 2201/011* (2013.01)

(58) Field of Classification Search
CPC .............. B22F 9/24; C08K 2003/0806; C08K 2201/001; C08K 2201/003; C08K 2201/004; C08K 2201/011; C08K 7/24; C08K 9/04; C09C 1/62; C09C 3/10; C09D 11/037; C09D 11/106; C09D 11/52; H01B 1/00; H01B 1/22
See application file for complete search history.

(56) References Cited

U.S. PATENT DOCUMENTS

| | | | |
|---|---|---|---|
| 2008/0003130 A1 | 1/2008 | Xia et al. | |
| 2018/0086949 A1* | 3/2018 | Morioka | C08K 3/08 |

* cited by examiner

SILVER NANOWIRES, METHOD FOR PRODUCING SAME, AND INK

TECHNICAL FIELD

The present invention relates to silver nanowires that are useful as a material for forming a transparent conductor, and a method for producing the same. The invention also relates to a silver nanowires ink using the silver nanowires.

BACKGROUND ART

In the description herein, an aggregate of minute metal wires having a thickness of approximately 200 nm or less is referred to as "nanowires". In comparison to powder, the respective wire correspond to "particle" constituting the powder, and the nanowires correspond to "powder" as an aggregate of particles.

Silver nanowires are expected as a conductive material for imparting conductivity to a transparent substrate. By coating a fluid containing silver nanowires (i.e., a silver nanowires ink) on a transparent substrate, such as glass, PET (polyethylene terephthalate) and PC (polycarbonate), followed by removing the liquid component by evaporation or the like, the silver nanowires are in contact with each other on the substrate to form a conductive network, thereby achieving a transparent conductor. For a transparent conductive material, a metal oxide film represented by ITO has been mainly used for such purposes as a transparent electrode. However, a metal oxide film has defects including the high film forming cost, the low resistance to bending, which may prevent the final product becoming flexible, and the like. A conductive film for a touch-sensitive panel sensor, which is one of the major applications of a transparent conductor, is demanded to have high transparency and high conductivity, and the demand in visibility thereof is also increasing in recent years. An ordinary ITO film necessarily has an increasing thickness of the ITO layer for enhancing the conductivity thereof, but the increase of the thickness may decrease the transparency, and the visibility may not be improved.

Silver nanowires are expected to avoid the aforementioned defects peculiar to a metal oxide film represented by ITO.

A known production method of silver nanowires include a method of dissolving a silver compound in a polyol solvent, such as ethylene glycol, and depositing metallic silver having a linear shape by utilizing the reduction power of the polyol as the solvent in the presence of a halogen compound and PVP (polyvinylpyrrolidone) as an organic protective agent (PTLs 1 and 2 and NPT 1). PVP is a substance that is considerably effective as an organic protective agent for synthesizing silver nanowires with good yield.

CITATION LIST

Patent Literatures

PTL 1: US 2005/0056118
PTL 2: US 2008/0003130

Non-Patent Literature

NPL 1: J. of Solid State Chem., 1992, 100, 272-280

SUMMARY OF INVENTION

Technical Problem

For producing a transparent conductor with silver nanowires, a process step of coating a "silver nanowires ink" on a transparent substrate is necessary. The ordinary silver nanowires covered with PVP show good dispersibility in water, and therefore are generally available as a silver nanowires ink using an aqueous liquid medium. However, it is necessary to improve the wettability thereof to PET (polyethylene terephthalate) frequently used as the transparent substrate, and therefore an alcohol, such as ethanol, 2-propanol, and ethylene glycol, is generally added to the aqueous solvent of the silver nanowires ink. The wettability to a PET substrate is enhanced by increasing the amount of the alcohol added. However, the addition of the alcohol causes a problem of deterioration of the dispersibility of the silver nanowires covered with PVP in a liquid. Specifically, when the amount of the alcohol added to the aqueous solvent is increased, the silver nanowires covered with PVP tend to be aggregated in a liquid, and it becomes difficult to provide a silver nanowires ink having good dispersibility.

For achieving both high transparency and high conductivity, silver nanowires advantageously have a smaller diameter and a larger length. The ordinary silver nanowires synthesized by using PVP are not necessarily satisfactory in consideration of the demanded characteristics, which are expected to be more severe in such purposes as a touch-sensitive panel sensor (i.e., the achievement of both transparency and conductivity at higher levels).

As one measure for improving the dispersibility of the silver nanowires in an aqueous solvent having an alcohol added thereto, it is considered that the application of an "alkylated PVP", which is obtained by reducing the hydrophilicity of PVP, to an organic protective agent is effective. However, it is difficult to synthesize wires having a thin and long shape by a synthesis method of silver nanowires using the alkylated PVP as the organic protective agent.

As described above, such a technique has not yet been established that meets the need of silver nanowires that exhibit better dispersibility than the ordinary PVP-covered silver nanowires in an aqueous solvent having an alcohol added thereto. In particular, it is further difficult to achieve simultaneously another need of thinner and longer wires. An object of the invention is to provide silver nanowires that achieve both the needs.

Solution to Problem

As a result of investigations made by the present inventors, it has been found that the dispersibility of silver nanowires in an aqueous solvent having an alcohol added thereto can be improved, and wires having a thin and long shape can be synthesized, by using a "copolymer of a maleimide-based monomer and vinylpyrrolidone" instead of PVP as an organic protective agent in the reduction deposition of silver in a wire form in an alcohol solvent in the presence of the organic protective agent.

The object can be achieved by silver nanowires having an average diameter of 100 nm or less and an average length of 5 μm or more, covered with a copolymer of a maleimide-based monomer and vinylpyrrolidone. The silver nanowires that have an average diameter of 50 nm or less and an average length of 10 μm or more are preferred. Assuming that the ratio of the average length (nm) and the average diameter (nm) is referred to as an aspect ratio, the silver nanowires that have an aspect ratio of 200 or more are particularly preferred. The average diameter, the average length, and the aspect ratio are in accordance with the following definitions.

Average Diameter

In a projected image of one metal wire on a micrograph (for example, an FE-SEM micrograph), the diameters of inscribed circles tangent to the contours on both sides in the thickness direction are measured over the entire length of the wire, and the average value of the diameters is designated as the average diameter of the wire. The average value of the diameters of the respective wires constituting the nanowires is designated as the average diameter of the nanowires. The total number of the wires to be measured for calculating the average diameter is 100 or more.

Average Length

In a projected image of one metal wire on a micrograph as similar to the above, the length of the line passing through the center of the thickness of the wire (i.e., the center of the inscribed circle) from one end to the other end of the wire is designated as the length of the wire. The average value of the lengths of the respective wires constituting the nanowires is designated as the average length of the nanowires. The total number of the wires to be measured for calculating the average length is 100 or more.

The silver nanowires according to the invention are constituted by wires each having an extremely long and thin shape. Therefore, the silver nanowires thus recovered often exhibit a curved string form rather than a straight rod form. The inventors have developed a software for measuring the wire length efficiently on the image for the curved wires, and have utilized the software for processing the data.

Average Aspect Ratio

The average diameter and the average length are substituted into the following expression (1) to calculate the average aspect ratio.

$$\text{(average aspect ratio)} = \text{(average length (nm))}/\text{(average diameter (nm))} \quad (1)$$

The maleimide-based monomer is a monomer that has a maleimide group. The molecular weight thereof may be, for example, from 97 to 300. More specifically, examples thereof include N-methylmaleimide (FIG. 5), N-ethylmaleimide, maleimide (FIG. 16), 6-maleimidohexanoic acid, N-propylmaleimide (FIG. 9), and N-tert-butylmaleimide (FIG. 12).

As a production method of the silver nanowires covered with the copolymer, a method for producing silver nanowires is provided, containing reductively depositing silver in a wire form in an alcohol solvent having dissolved therein a silver compound, the deposition being performed in the solvent having dissolved therein a copolymer of a maleimide-based monomer and vinylpyrrolidone. The synthesis of silver nanowire by this method provides silver nanowire covered with a "copolymer of a maleimide-based monomer and vinylpyrrolidone" as an organic protective agent.

In this case, the deposition that is performed in the solvent having dissolved therein a copolymer of a maleimide-based monomer and vinylpyrrolidone, a chloride, a bromide, an alkali metal hydroxide, and an aluminum salt is particularly effective for synthesizing thin and long wires. Examples of the maleimide-based monomer include N-methylmaleimide, N-ethylmaleimide, maleimide, 6-maleimidohexanoic acid, N-propylmaleimide, and N-tert-butylmaleimide, as described above. The copolymer of a maleimide-based monomer and vinylpyrrolidone may have, for example, a structure containing from 0.1 to 25 parts by mass of the maleimide-based monomer and 100 parts by mass of vinylpyrrolidone polymerized. Examples of the alcohol as the solvent include a polyol. The reduction deposition of silver is more effectively performed in a temperature range of 60° C. or more and a boiling point of the solvent alcohol used or less.

In the invention, a silver nanowires ink is provided, containing the silver nanowires covered with a copolymer of a maleimide-based monomer and vinylpyrrolidone, in an amount of from 0.02 to 5.0% by mass, in a liquid medium.

Advantageous Effects of Invention

The invention describes silver nanowires covered with a copolymer of a male imide-based monomer and vinylpyrrolidone. This new-type organic protective agent exhibits an effect that is different from PVP in that the dispersibility in an aqueous solvent having an alcohol added thereto is improved. The extents of the hydrophilicity and the hydrophobicity of the organic protective agent can be changed by controlling the mixing proportion of the maleimide-based monomer contained in the copolymer, and thus the dispersibility can be easily adapted to the kind of the liquid medium of the silver nanoink. Accordingly, the invention is considerably useful for providing a silver nanowires ink improved in wettability to a PET substrate or the like by adding an alcohol or the like. Furthermore, in the case where the copolymer of a maleimide-based monomer and vinylpyrrolidone is used as the organic protective agent, thin and long silver nanowires having, for example, an average diameter of 50 nm or less, an average length of 10 μm or more, and an average aspect ratio of 200 or more can be synthesized. The thin and long silver nanowires are considerably effective for improving a transparent conductor in conductivity and visibility (haze resistance).

As described above, the invention simultaneously achieves (i) the synthesis of thin and long silver nanowire, (ii) the improvement of the dispersibility of a silver nanowires ink, and (ii) the improvement of the wettability of a silver nanowires ink to a transparent substrate.

DESCRIPTION OF EMBODIMENTS

Synthesis of Silver Nanowires

Figure 1:
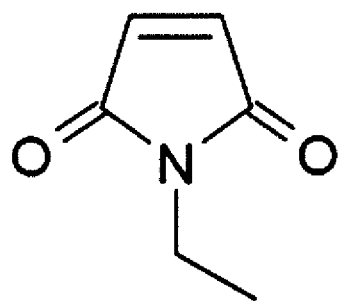
FIG. 1 is a structural formula of N-ethylmaleimide.

The silver nanowires according to the invention are covered with a "copolymer of a maleimide-based monomer and vinylpyrrolidone" as an organic protective agent. The silver nanowires can be synthesized by such a method that silver is reductively deposited in a wire form in an alcohol solvent by utilizing the reduction power of the alcohol solvent in the presence of the organic protective agent. The method will be described below.

Alcohol Solvent

The kind of the alcohol to be applied may be selected in such a manner that the alcohol has suitable reduction power to silver, and is capable of depositing metallic silver in a wire form. Under the current situation, it has been said that a polyol, represented by ethylene glycol, is relatively suitable for the formation of silver nanowire, but it is considered that larger kinds of alcohol compounds may be confirmed as applicable by the future researches. The inventors have succeeded at the synthesis of thin and long silver nanowires in an alcohol solvent containing one or more of ethylene glycol, propylene glycol (1,2-propanediol), 1,3-propanediol, 1,3-butanediol, 1,4-butanediol, and glycerin, in an industrially practicable yield. These alcohols may be used solely or as a mixture of two or more kinds thereof.

Organic Protective Agent

The organic protective agent has a function of covering the surface of silver nanowires deposited through the reduction reaction and preventing the silver nanowires from growing coarsely. The organic protective agent present on the surface of the resulting silver nanowires has a function of ensuring the dispersibility thereof in a liquid medium. PVP (polyvinylpyrrolidone) has been known as an organic protective agent that is effective for synthesizing silver nanowires through deposition of silver preferentially in only one direction. However, silver nanowires that are synthesized by using PVP are difficult to form a silver nanowires ink having good dispersion stability. In the case where a silver nanowires ink is coated on a transparent substrate, represented by a PET substrate, the ink necessarily has good wettability to the substrate. An aqueous solvent is generally used in the silver nanowires ink due to the high hydrophilicity of PVP. In this case, an alcohol is generally added to the aqueous solvent for ensuring the wettability to the substrate, such as PET. The addition of an alcohol enhances the wettability to the substrate, but largely lowers the dispersibility of the silver nanowires covered with PVP in the aqueous solvent. Specifically, the silver nanowires in the form of ink are liable to be precipitated. The silver nanowires synthesized by using PVP thus have a severe restriction in the enhancement of the dispersion stability of the silver nanowires ink.

The inventors have found that the use of a copolymer of a male imide-based monomer and vinylpyrrolidone instead of PVP can achieve simultaneously both the synthesis of thin and long silver nanowires and the enhancement of the dispersibility of silver nanowires in an aqueous solvent having an alcohol added thereto.

Examples of the maleimide-based monomer include compounds having a molecular weight of from 97 to 300. For example, N-methylmaleimide, N-ethylmaleimide, maleimide, 6-maleimidohexanoic acid, N-propylmaleimide, N-tert-butylmaleimide, and the like may be used.

A maleimide derivative is an $\alpha,\beta$-disubstituted monomer, and thus forms a rigid cyclic structure in a main chain of a polymer obtained through polymerization thereof. Accordingly, a copolymer of a maleimide-based monomer and vinylpyrrolidone becomes a copolymer having decreased flexibility (i.e., a rigid copolymer), as compared to PVP. The rigid copolymer structure acts in the direction decreasing the hydrophilicity, and associated therewith, the dispersibility in an aqueous solution having an alcohol added thereto is improved. The maleimide-based monomer itself exhibits high hydrophilicity, but the hydrophobicity is increased through the progress of polymerization with vinylpyrrolidone, so as to form a copolymer that is different from PVP. Furthermore, a maleimide derivative can have various substituents introduced thereto, and thus has an advantage that the solubility and dispersibility in an aqueous solution having an alcohol added thereto can be controlled through the structure of the substituent.

The affinity to an aqueous solvent having an organic substance, such as an alcohol, added thereto can be controlled through the polymerization composition of the maleimide-based monomer and vinylpyrrolidone. With the copolymer having a composition obtained through polymerization of from 0.1 to 25 parts by mass of the maleimide-based monomer and 100 parts by mass of vinylpyrrolidone, the balance can be easily optimized between the synthesizability of thin and long silver nanowires and the dispersibility of silver nanowires in an aqueous solvent having an alcohol added thereto. Even though the mixing ratio of the maleimide-based monomer is as small as 0.1 part by mass per 100 parts by mass of vinyl pyrrolidone, the dispersibility can be largely enhanced as compared to PVP. In the case where the mixing ratio of the maleimide-based monomer becomes excessive, on the other hand, it may be difficult to synthesize thin and long silver nanowires. The mixing ratio of the maleimide-based monomer per 100 parts by mass of vinylpyrrolidone is more preferably in a range of from 0.1 to 10 parts by mass.

Silver Compound

A silver compound that is soluble in the solvent is used as a silver source for the reduction deposition of silver nanowires. Examples thereof include silver nitrate, silver acetate, silver oxide, and silver chloride, and silver nitrate ($AgNO_3$) is conveniently used in consideration of the solubility in the solvent and the cost. The amount of Ag added to the total amount of the alcohol solvent used is preferably in a range of from 0.001 to 0.1 mol of Ag, and more preferably in a range of from 0.025 to 0.080 mol of Ag, per 1 L of the solvent.

Chloride

For the reduction deposition of metallic silver in a wire form in the alcohol solvent, the presence of a chloride ion having a function of imparting anisotropy to the growing direction in the deposition is effective. It is considered that a chloride ion quickly etches the particular crystal plane of metallic silver formed through nucleation to facilitate formation of multiple twinning, thereby enhancing the proportion of the crystal nuclei forming the wires. As the chloride ion source, various materials may be used that are chlorides soluble in the alcohol as the solvent. TBAC (tetrabutylammonium chloride, $(CH_3CH_2CH_2CH_2)_4NCl$), which is an organic chlorine compound, may also be used. Preferred examples thereof include sodium chloride (NaCl), potassium chloride (KCl), hydrogen chloride (HCl), and lithium chloride (LiCl), which are industrially easily available and are inexpensive. Copper(II) chloride ($CuCl_2$), which is soluble in the alcohol solvent, may also be used. The amount of the chloride added based on the total amount of the alcohol solvent used is preferably in a range of from 0.00001 ($1\times10^5$) to 0.01 mol, and more preferably in a range of from 0.00005 ($5\times10^5$) to 0.01 mol, in terms of Cl amount per 1 L of the solvent.

Bromide

A bromide ion also has a function of imparting anisotropy to the growing direction in the deposition of metallic silver. As a result of various investigations, it has been found that a bromide ion that is present in the alcohol solvent in addition to the chloride ion is significantly effective for providing thin and long silver nanowires having, for example, an average diameter of 50 nm or less and an average length of 10 μm or more. As the bromide ion source, various materials may be used that are bromides soluble in the alcohol as the solvent. CTAB (cetyltrimethylammonium bromide, $(C_{16}H_{33})N(CH_3)_3Br$), which is an organic bromine compound, may also be used. Preferred examples thereof include sodium bromide (NaBr), potassium bromide (KBr), hydrogen bromide (HBr), and lithium bromide (LiBr), which are industrially easily available and are inexpensive. The amount of the bromide added may be extremely small, but the bromide is an extremely effective additive for imparting anisotropy. The amount of the bromide added based on the total amount of the alcohol solvent used is preferably in a range of from 0.000001 ($1\times10^6$) to 0.001 ($1\times10^{-3}$) mol, and more preferably in a range of from 0.000005 ($5\times10^{-6}$) to 0.001 ($1\times10^3$) mol, in terms of Br amount per 1 L of the solvent.

Aluminum Salt and Alkali Metal Hydroxide

According to the investigations made by the inventors, an aluminum salt and an alkali metal hydroxide that are dissolved in prescribed ratios in the solvent, in which silver is deposited, are significantly effective for synthesizing silver nanowires having a large aspect ratio. While the mechanism of the phenomenon is not clear under the current circumstances, it is expected that an aluminum ion is expected to have a function of activating the crystal plane for growing silver in a wire form, and a function of enhancing the reducing rate, and it is considered that the functions are exhibited in the appropriate presence of a hydroxide ion.

The presence of Al is confirmed in the silver nanowires that are synthesized in the solvent containing an aluminum salt. As a result of the researches by the inventors, there is a tendency that metal nanowires containing Al in an amount of from 100 to 1,000 ppm in the metal components have high uniformity in diameter and hardly suffer local breakage or bending irrespective of the thin and long form thereof. These silver nanowires are excellent in handleability in the operation of forming an ink and the operation of coating on a substrate. The silver nanowires having an Al content of 200 ppm or more are more preferred.

In the description herein, the molar ratio of the total Al amount of the aluminum salt dissolved in the solvent and the total hydroxide ion amount of the alkali metal hydroxide dissolved therein is expressed by "Al/OH", and the molar ratio may be hereinafter referred simply to as "Al/OH molar ratio". As a result of detailed investigations, thin and long silver nanowires can be synthesized with an Al/OH molar ratio of from 0.01 to 0.40. When the Al/OH molar ratio is too large, the reduction power of the alcohol solvent may be decreased, and the silver ion or the silver complex dissolved in the solvent may not be reduced to metallic silver. When the Al/OH molar ratio is too small, it may be difficult to synthesize long wires having a large average aspect ratio.

Even in the case where the Al/OH molar ratio is in the appropriate range, however, when the amount of the alkali hydroxide is too large with respect to silver, a large amount of the synthesis product mainly containing silver oxide is formed, thereby failing to synthesize wires. When the amount of alkali hydroxide is too small with respect to silver, on the other hand, it may be difficult to cause the reduction reaction of silver. In the description herein, the molar ratio of the total hydroxide ion amount of the alkali metal hydroxide dissolved in the solvent and the total Ag amount of the silver compound dissolved therein is expressed by "OH/Ag", and the molar ratio may be hereinafter referred simply to as "OH/Ag molar ratio". As a result of detailed investigations, the OH/Ag molar ratio is desirably in a range of from 0.005 to 0.50.

The alkali metal hydroxide used is industrially preferably one or more of lithium hydroxide, sodium hydroxide, and potassium hydroxide.

The aluminum salt used may be aluminum nitrate and aluminum chloride. Aluminum nitrate may be added in the form of aluminum nitrate nonahydrate $Al(NO_3)_3 \cdot 9H_2O$. In the case where aluminum chloride is used, aluminum chloride may cover the aforementioned chloride.

Examples of Synthesis Procedure of Silver Nanowires

A method of providing silver nanowires in an alcohol solvent having a silver compound dissolved therein, through the reduction power of the alcohol as the solvent in the presence of a halogen compound and an organic protective agent has been known. In this case, it has been said that PVP is suitable as an organic protective agent for depositing metallic silver in a wire form. In the invention, silver nanowires are formed by utilizing the reduction power of the alcohol solvent. In the invention, however, the copolymer of the maleimide-based monomer and vinylpyrrolidone is used instead of PVP as the organic protective agent.

The temperature where the reduction deposition reaction of silver is performed may be set in a range of 60° C. or more and the boiling point of the solvent used or less. The boiling point herein is a boiling point under the pressure of the gas phase space in contact with the liquid surface of the solvent inside the reaction vessel. In the case where plural kinds of alcohols are used as the solvent, the temperature may be the boiling point of the alcohol having the lowest boiling point or less. From the standpoint that the reaction is performed moderately, however, the temperature is preferably controlled to a temperature lower than the boiling point for avoiding boiling. In the case where ethylene glycol is used as the solvent, and the reaction is performed under the atmospheric pressure, for example, the reaction is preferably performed at a temperature of from 60 to 185° C., and more preferably from 80 to 175° C., while ethylene glycol has a boiling point of approximately 197° C. The reaction time may be set in a range of from 10 minutes to 100 hours.

As for the procedures, it is preferred that the substances except for the silver compound are dissolved in the alcohol solvent, and after the temperature of the solvent (which is hereinafter referred to as a solution A) reaches the prescribed reaction temperature, the silver compound is added to the solution A. The silver compound may be added in such a manner that the silver compound is dissolved in advance in an alcohol solvent of the same kind as the aforementioned solvent in a separate vessel, and the silver-containing liquid (which is hereinafter referred to as a solution B) is mixed in the solution A. The solution B before mixing in solution A preferably has a temperature around ordinary temperature (for example, from 15 to 40° C.). When the temperature of the solution B is too low, a long period of time may be required for dissolving the silver compound, and when the temperature thereof is too high, the reduction reaction of silver tends to occur before the step of mixing in the solution A due to the reduction power of the alcohol solvent in the solution B. A silver compound that is easily dissolved in the alcohol solvent, such as silver nitrate, may be added in the form of solid to the solution A. The addition of the silver compound may be performed by a method of adding the entire amount thereof at one time, and a method of adding intermittently or continuously over a certain period of time. The liquid is continuously stirred while the reaction proceeds. The atmosphere of the gas phase in contact with the liquid surface of the solution A while the reaction proceeds may be the air atmosphere or nitrogen.

After completing the deposition reaction of silver, a slurry containing silver nanowires is subjected to solid-liquid separation by such a measure as centrifugal separation or decantation, so as to recover the solid matter. The decantation may be performed by condensing while still standing over from 2 to 2 weeks, or by condensing through the enhancement of the sedimentation rate by adding at least one of a solvent having small polarity, such as acetone, toluene, hexane, and kerosene, thereto. In the case of centrifugal separation, the slurry after the reaction may be subjected directly to a centrifugal separator, so as to condense the silver nanowires.

After condensing, the supernatant is removed. Thereafter, a solvent having large polarity, such as water and an alcohol, is added for redispersing the silver nanowires, and the solid matter is recovered by solid-liquid separation by such a measure as centrifugal separation or decantation. The procedure of redispersion and condensing (i.e., washing) is preferably performed repeatedly.

Purification of Silver Nanowires

In the synthesis of silver nanowires, silver nanoparticles and short silver nanowires are also formed in addition to the sufficiently long silver nanowires. The operation of removing as much as possible the products belonging to impurities (which are hereinafter referred to as "production impurities"), such as these particles and short wires, so as to separate and recover the useful long silver nanowires is referred to as "purification".

In the purification, by utilizing the phenomenon where the silver nanowires having a larger volume preferentially undergo sedimentation, the solid matter containing the silver nanowires recovered after the synthesis is dispersed in water, and then the production impurities can be removed along with the supernatant through centrifugal separation or decantation. For further increasing the sedimentation rate, the aforementioned solvent having small polarity may be added.

The production impurities, such as the nanoparticles and short wires, have high aggregating property, and are hardly separated due to the adhesion to the long nanowires. As a measure for the case, the inventors have found that the separation of the production impurities can be facilitated by adding a dispersant or a surfactant on dispersing the solid matter containing the silver nanowires (i.e., the concentrated product) in water, so as to provide a better dispersion state. Examples of the preferred dispersant include PVP.

Filtration with a filter having a small pore size, such as a membrane filter or a nylon filter, traps the silver nanowires to be recovered since the silver nanowires have a length larger than the filter pore diameter, and the production impurities passing through the filter can be separated. In addition, a cross-flow filtration method may be effectively applied.

The solid matter after washing contains mainly the silver nanowires having the organic protective agent on the surface thereof. The silver nanowire may be stored in the form of a dispersion liquid containing the silver nanowires dispersed in a suitable liquid medium depending on the purpose. In the case where the silver nanowires are applied to a production method of a silver nanowires ink, the "ink formation" may be performed by adding a viscosity modifier and a binder component described later to the silver nanowire dispersion liquid containing the solid matter after washing dispersed in water or an alcohol.

Silver Nanowires Ink

For producing a silver nanowires ink, a dispersion liquid of the silver nanowires having been purified in the aforementioned manner is prepared, and is then adjusted to have prescribed properties by adding a viscosity modifier and a binder component. Herein, an ink containing an aqueous solvent having an alcohol effective for improving wettability to a PET substrate added thereto is exemplified, and preferred additional substances, composition, properties, dispersion stability, and the like of the ink are described below.

Viscosity Modifier

A viscosity modifier used in the invention is necessarily soluble in a mixture of water and an alcohol as the solvent. Various water-soluble polymers having been used as a thickener in various fields can be used. Examples of the natural substances and derivatives thereof include cellulose materials and derivatives thereof, such as CMC (carboxymethyl cellulose) and MC (methyl cellulose), and examples of the protein materials include albumin (a component of egg white) and casein (contained in milk). As another examples, alginic acid, agar, starch, polysaccharides can also be used as a water-soluble thickener. Examples of the synthetic material include polymers, such as a vinyl compound, a polyester compound, a polyvinyl alcohol compound, and a polyalkylene oxide compound.

Binder

In a transparent conductive coated film obtained by coating and drying a silver nanowires ink on a substrate, the adhesiveness among the respective silver nanowires and the adhesiveness between the silver nanowires and the substrate largely affect the yield in the production of the transparent conductive film, and thus are significantly important. For ensuring the adhesiveness, a binder component functioning as an "adhesive" is necessarily added. In the description herein, a transparent coated film obtained by coating and drying the silver nanowires ink on a substrate, in which the respective wires are integrated to exhibit conductivity, is referred to as a transparent conductive coated film.

The conductivity of the transparent conductive film (which is an adhered structure of a film substrate and the transparent conductive coated film thereon) is exhibited through the contact among metals of the silver nanowires constituting the transparent conductive coated film. The binder component added to the silver nanowires ink may provide a possibility that sufficient conductivity cannot be obtained by preventing the contact among metals of the wires. Accordingly, such a measure has been frequently used that a silver nanoink that does not contain a strong binder component is coated and dried on a substrate to secure the contact among the wires, and thereafter an overcoating agent containing an adhesive component is coated to ensure the adhesiveness of the transparent conductive coated film.

However, in the measure using the overcoating performed, it is an ordinary procedure that the film obtained after coating the silver nanowires ink is passed repeatedly through the positions in the furnace where the traveling direction thereof is changed with a roll, for ensuring the drying time. The substrate is bent at the positions of rolls on the line, through which the film is passed, and thereby a stress is applied to the coated film, resulting in a possibility of deterioration of the conductivity through the contact among the wires. For retaining good conductivity, it is difficult to perform an operation with an increased line speed, and thus the enhancement of productivity cannot be expected. Furthermore, such a procedure is often employed that the film is once wound up into a coil form for the delivery to the subsequent process steps, and then again wound off in the overcoating step. In this case, a stress is applied to the surface of the coated film on the substrate on winding up and winding off, resulting in a possibility of deterioration of the conductivity and release off from the substrate. Accordingly, even in the case where the overcoating is performed, it is necessary for enhancing the productivity that any kind of a binder component is added to the silver nanowires ink, so as to enhance the adhesiveness among the wires and the adhesiveness between the substrate and the coated film. In the following description, the "adhesiveness" means both the adhesiveness among the wires and the adhesiveness between the substrate and the coated film, unless otherwise indicated.

The binder added to the silver nanowires ink is demanded to be excellent in conductivity, optical capability (including a high transmittance and a small haze), and adhesiveness. However, it is not easy to achieve these at high levels. The binder is basically an adhesive, and improper selection thereof may largely impair the conductivity due to the adhesive intervening in the contact points of the silver nanowires. Furthermore, there is a problem that the silver nanowires tend to be attached to each other in the ink due to the presence of the adhesive, so as to cause aggregation. Examples of the preferred binder component include a water-soluble acrylic-urethane copolymer. A composition having a water-soluble acrylic-urethane copolymer applied thereto will be described below as an example.

Ink Composition

In terms of mass proportion based on the total amount of the silver nanowires ink, the content of the silver nanowires is preferably from 0.02 to 1.0% by mass, the amount of the viscosity modifier added is preferably from 0.01 to 1.0% by mass, and the amount of the binder component added in terms of the amount of the water-soluble acrylic-urethane copolymer added as an effective ingredient is preferably from 0.01 to 2.0% by mass. The solvent is preferably a mixture of water and an alcohol, in which the mass proportion of the alcohol is preferably from 5 to 40% by mass, and the balance is preferably water. The alcohol preferably has a polarity providing a solubility parameter (SP value) of 10 or more. Examples thereof used include low boiling point alcohols, such as methanol, ethanol, and isopropyl alcohol (2-propanol). The SP values are said to be 23.4 for water, 14.5 for methanol, 12.7 for ethanol, and 11.5 for isopropyl alcohol.

Viscosity and Surface Tension

The silver nanowires ink may have, for providing good coating property, a viscosity of from 1 to 100 mPa·s at a shear rate of 300 (1/s) in a rotation viscometer and a surface tension of from 20 to 80 mN/m.

The viscosity may be measured, for example, with a rotation viscometer (HAAKE RheoStress 600, produced by Thermo Scientific, Inc., measurement cone: cone C60/1° Ti, D=60 mm, plate: Meas. Plate cover MPC60).

The surface tension may be measured with a full-automatic surface tension meter (for example, a full-automatic surface tension meter, CBVP-Z, produced by Kyowa Interface Science Co., Ltd.).

Dispersion Stability of Silver Nanowires Ink

The dispersion stability can be evaluated in such a manner that while a container having the thus-produced silver nanowires ink housed therein is allowed to stand still, the silver nanowires ink immediately after production and that after the prescribed period of time each are coated on a substrate to form dried coated films, and the dried coated films are measured for sheet resistance. With an ink having good dispersion stability of the silver nanowires, the sheet resistance values obtained by coating the inks immediately after the production, after 4 hours, after 8 hours, and after 24 hours are the same as each other without substantially no difference. With an ink having poor dispersion stability, the concentration of the silver nanowires dispersed in the ink is lowered due to deposition of the silver nanowires, and the sheet resistance value is increased in the inks with an increased elapsed time, i.e., 4 hours, 8 hours, and 24 hours. The ink having poor dispersion stability in a container is confirmed by visual observation to form a transparent supernatant after an increased elapsed time (8 hours or 24 hours).

The dispersion stability is significantly important in the production of a transparent conductor. One of the important purposes of silver nanowires is a transparent conductive film. In the production process thereof, a silver nanoink is continuously coated on a PET film as a transparent substrate with a coating device in a roll-to-roll process, and the continuous coating time may be half a day at the longest. While the silver nanowires ink is housed in the ink tank of the coating device during that period of time, the silver nanowires may be precipitated and aggregated in the ink tank if the silver nanowires have poor dispersion stability, and thus it may be difficult to form a coated layer having stable quality.

EXAMPLES

Example 1

Production of Copolymer of Maleimide-Based Monomer and Vinylpyrrolidone

In a 100 ml, glass vessel capable of being sealed with a lid, 45 g of 1,4-dioxane as a solvent, 10.014 g of 1-vinyl-2-pyrrolidone, 1.113 g of N-ethylmaleimide (molecular weight: 125.13), and 0.576 g of 2,2'-azobis(isobutyronitrile) as a polymerization initiator were placed, and the substances were dissolved in the solvent by stirring with a magnetic stirrer. Under stirring the solution after dissolving, after blowing nitrogen gas therein for 10 minutes, the vessel was sealed with the lid to retain the nitrogen atmosphere. The solution was retained at 60° C. for 24 hours under stirring with a magnetic stirrer at 500 rpm. After 24 hours, the vessel was quickly cooled by immersing in iced water for terminating the reaction.

The following rinsing operation was performed for the purpose of removing the monomers, the polymerization initiator, and the like that were unreacted.

The solution having been retained for 24 hours was added dropwise to 500 mL of diethyl ether under stirring with a burette. A vinylpyrrolidone-ethylmaleimide copolymer was precipitated by the dropwise addition. The vinylpyrrolidone-ethylmaleimide copolymer thus precipitated was collected by filtering with a membrane filter, and dried by vacuum drying at room temperature for 30 minutes, thereby providing a solid matter of the vinylpyrrolidone-ethylmaleimide copolymer (the first rinsing step completed).

The solid matter of the vinylpyrrolidone-ethylmaleimide copolymer having been subjected to the first rinsing step was dissolved in 100 mL of chloroform. The solution was added dropwise to 500 mL of diethyl ether under stirring with a burette. The vinylpyrrolidone-ethylmaleimide copolymer was precipitated by the dropwise addition. The vinylpyrrolidone-ethylmaleimide copolymer thus precipitated was collected by filtering with a membrane filter, and dried by vacuum drying at room temperature for 30 minutes, thereby providing a solid matter of the vinylpyrrolidone-ethylmaleimide copolymer (the second rinsing step completed).

The solid matter of the vinylpyrrolidone-ethylmaleimide copolymer having been subjected to the second rinsing step was again dissolved in 100 mL of chloroform. The solution was added dropwise to 500 mL of diethyl ether under stirring with a burette. The vinylpyrrolidone-ethylmaleimide copolymer was precipitated by the dropwise addition. The vinylpyrrolidone-ethylmaleimide copolymer thus precipitated was collected by filtering with a membrane filter, and dried by vacuum drying at 60° C. for 24 hours, thereby providing a dried product of the vinylpyrrolidone-ethylmaleimide copolymer (the third rinsing step completed).

Figure 2:
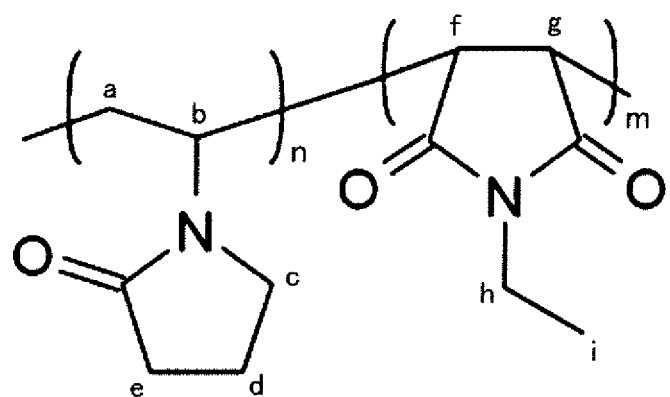
FIG. 2 is a structural formula of a vinylpyrrolidone-ethylmaleimide copolymer.

Through the aforementioned rinsing steps, the dried product of the vinylpyrrolidone-ethylmaleimide copolymer having a structure obtained through polymerization of 11.11 parts by mass of the maleimide-based monomer and 100 parts by mass of vinylpyrrolidone was produced. The charged amounts of the monomers converted to percentage by mass were 10% by mass for ethylmaleimide and 90% by mass for vinylpyrrolidone. FIG. 2 shows the structural formula of the vinylpyrrolidone-ethylmaleimide copolymer. The lower-case alphabet symbols shown in the figure show the correspondence relationship to the peak positions in the NMR (nuclear magnetic resonance) spectrum shown in FIG. 3 described later.

The resulting vinylpyrrolidone-ethylmaleimide copolymer was measured for the weight average molecular weight by gel permeation chromatography (GPC). As a pretreatment, the copolymer was dissolved in N,N-dimethylformamide (having 30 mM lithium bromide added thereto) as an eluent, and the solution was filtered with a membrane filter having a pore diameter of 0.45 µm. The filtrate having been passed through the filter was used as a specimen for the measurement. The other measurement conditions are shown below.

Columns: TSKgel α-M×2+α-2500
Eluent: N,N-dimethylformamide (having 30 mM lithium bromide added thereto)
Flow rate: 1.0 mL/min
Detectors: IR detector, light scattering detector (MALS)
Column temperature: 40° C.
Injection amount: 200 µL As a result of the measurement, the weight average molecular weight measured was 1,800,000.

Figure 3:
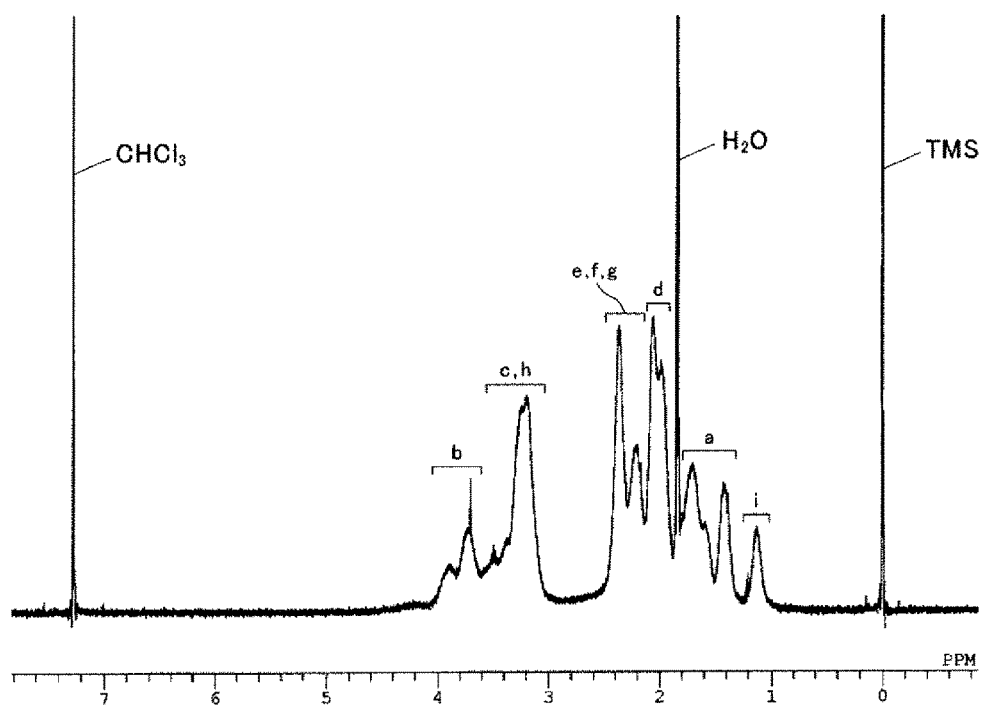
FIG. 3 is the NMR spectrum of the vinylpyrrolidone-ethylmaleimide copolymer used in Example 1.

The resulting vinylpyrrolidone-ethylmaleimide copolymer was measured for the NMR (nuclear magnetic resonance) spectrum. FIG. 3 shows the NMR spectrum. The abscissa shows the chemical shift. In the NMR spectrum thus measured, the peaks were observed that were considered to correspond to the positions of the alphabet symbols shown in FIG. 2. Accordingly, it was confirmed that the vinylpyrrolidone-ethylmaleimide copolymer produced by the aforementioned procedures had a structural moiety derived from ethylmaleimide. In FIG. 3, "TMS" shows tetramethylsilane (0 ppm) as the standard substance contained in deuterated chloroform. The peaks of $CHCl_3$ and $H_2O$ contained in slight amounts in the solvent are also shown.

Production of Silver Nanowires

At ordinary temperature, 26 g of propylene glycol (1,2-propanediol) was placed in a 50 mL vial container, to which 0.332 g of the vinylpyrrolidone-ethylmaleimide copolymer obtained above, 0.151 g of a 1,2-propanediol solution having a lithium chloride content of 1% by mass, 0.195 g of a 1,2-propanediol solution having a lithium hydroxide content of 1% by mass, 0.166 g of a 1,2-propanediol solution having a potassium bromide content of 0.25% by mass, and 0.104 g of a 1,2-propanediol solution having an aluminum nitrate nonahydrate content of 2% by mass were added, followed by mixing, so as to provide a solution A. 0.212 g of silver nitrate was dissolved in 2 g of 1,2-propanediol to provide a solution B.

The entire amount of the solution A was heated from ordinary temperature to 115° C. and then stirred at 300 rpm for 20 minutes. After stirring for 20 minutes, the solution B was added to the solution A at 115° C. with a tube pump over 1 minute, and the mixture was retained at 115° C. for 12 hours while retaining the stirring state, thereby providing a reaction liquid where the deposition reaction of silver had been completed. Thereafter, the reaction liquid was cooled to ordinary temperature.

To the reaction liquid after cooling, 150 g of pure water and 50 g of ethanol were added, and the mixture was subjected to a centrifugal separation operation with a centrifugal separator at 3,000 rpm for 15 minutes. A concentrate and a supernatant were observed, and the supernatant was removed, whereas the concentrate was recovered.

To the concentrate obtained above, 150 g of pure water and 50 g of ethanol were added, and the concentrate was dispersed in the liquid by stirring for 10 minutes. The mixture was then subjected to a centrifugal separation operation with a centrifugal separator at 3,000 rpm for 15 minutes as similar to the above. A concentrate and a supernatant were observed, and the supernatant was removed, whereas the concentrate was recovered. The excessive organic protective agent may be disadvantageous for providing good conductivity, and the concentrate (solid matter) was sufficiently rinsed by repeating the rinsing operation further several times.

Figure 4A:
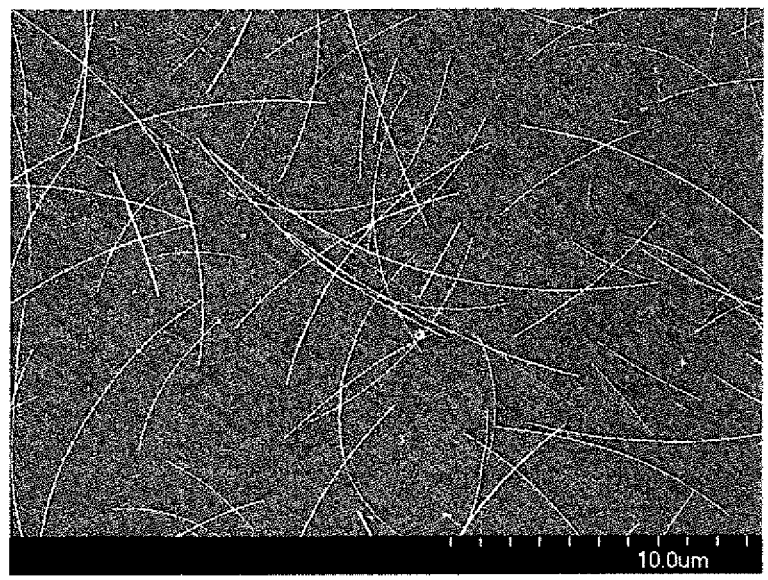
FIG. 4A is the SEM micrograph of the silver nanowires obtained in Example 1.
Figure 4B:
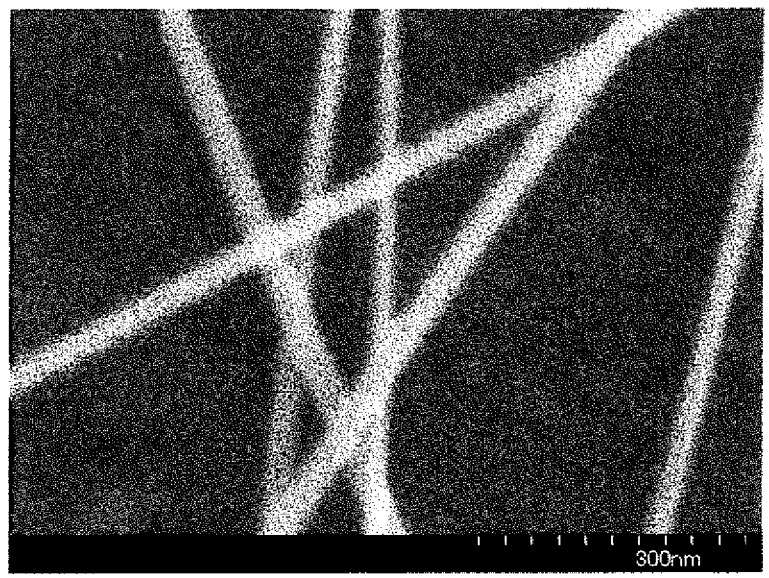
FIG. 4B is the SEM micrograph (high magnification) of the silver nanowires obtained in Example 1.
Figure 5:
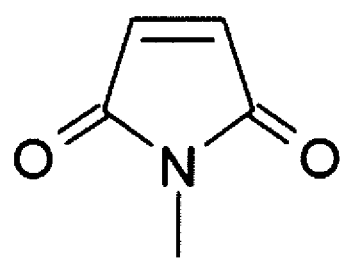
FIG. 5 is a structural formula of N-methylmaleimide.

Pure water was added to the solid matter after washing to provide a dispersion liquid of the solid matter. The dispersion liquid was sampled, and the observation of the dispersion liquid after evaporating pure water as a solvent on an observation stand with a high resolution FE-SEM (high resolution field emission scanning electron microscope) revealed that the solid matter was silver nanowires. FIGS. 4A and 4E exemplify the SEM micrographs of the silver nanowires. In the SEM observation, all the silver nanowires observed in five view fields selected arbitrarily were measured, and the average diameter and the average length were obtained according to the definitions described above. The total number of wires measured was 100 or more. The diameter was measured with SEM micrographs at a magnification of 150,000, and the length was measured with micrographs imaged with the high resolution SEM at a magnification of 2,500.

As a result, the average diameter of the silver nanowires obtained in this example was 31 nm, the average length thereof was 7.6 µm, and the average aspect ratio thereof was 7,600 nm/31 nm≈245.

The silver nanowires are covered with the vinylpyrrolidone-ethylmaleimide copolymer, and are significantly improved in dispersibility in an aqueous solvent having an alcohol added thereto.

Example 2

Production of Copolymer of Maleimide-Based Monomer and Vinylpyrrolidone

Figure 6:
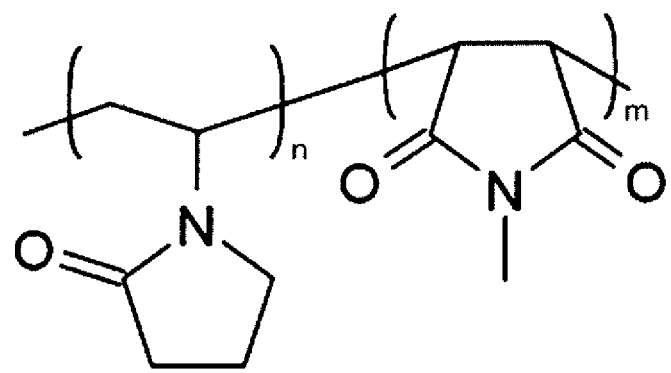
FIG. 6 is a structural formula of a vinylpyrrolidone-methylmaleimide copolymer.

A copolymer was produced under the same conditions as in Example 1 except that in the production of the copolymer in Example 1, 1.113 g of N-methylmaleimide (molecular weight: 111.10) was added instead of 1.113 g of N-ethylmaleimide. The resulting copolymer was a vinylpyrrolidone-methylmaleimide copolymer having a structure obtained through polymerization of 11.11 parts by mass of the maleimide-based monomer and 100 parts by mass of vinylpyrrolidone, and the charged amounts of the monomers converted to percentage by mass were 10% by mass for methylmaleimide and 90% by mass for vinylpyrrolidone. FIG. 6 shows the structural formula of the vinylpyrrolidone-methylmaleimide copolymer. As a result of a gel permeation chromatography (GPO) measurement, the weight average molecular weight of the resulting vinylpyrrolidone-methylmaleimide copolymer was 220,000.

Production of Silver Nanowires

At ordinary temperature, 26 g of propylene glycol (1,2-propanediol) was placed in a 50 mL vial container, to which 0.192 g of the vinylpyrrolidone-methylmaleimide copolymer obtained above, 0.151 g of a 1,2-propanediol solution having a lithium chloride content of 1% by mass, 0.107 g of a 1,2-propanediol solution having a lithium hydroxide content of 1% by mass, 0.166 g of a 1,2-propanediol solution having a potassium bromide content of 0.25% by mass, and 0.104 g of a 1,2-propanediol solution having an aluminum nitrate nonahydrate content of 2% by mass were added, followed by mixing, so as to provide a solution A. 0.212 g of silver nitrate was dissolved in 2 g of 1,2-propanediol to provide a solution B.

Figure 7A:
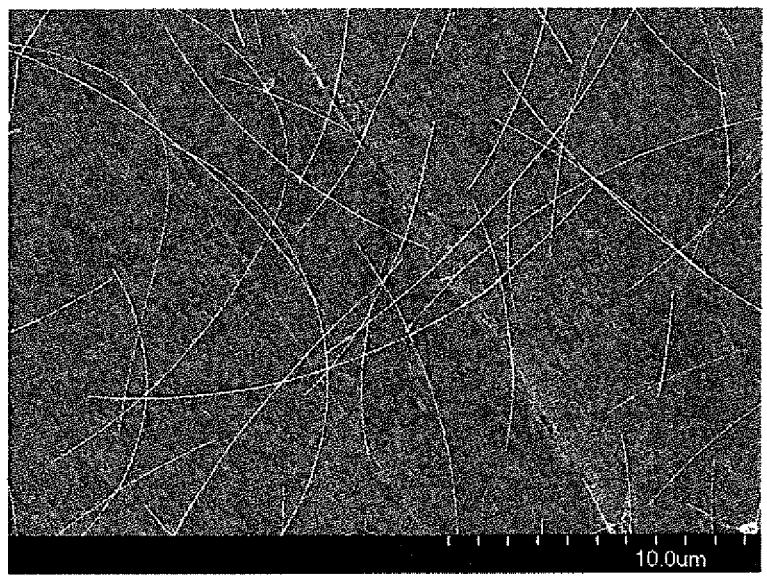
FIG. 7A is the SEM micrograph of the silver nanowires obtained in Example 2.
Figure 7B:
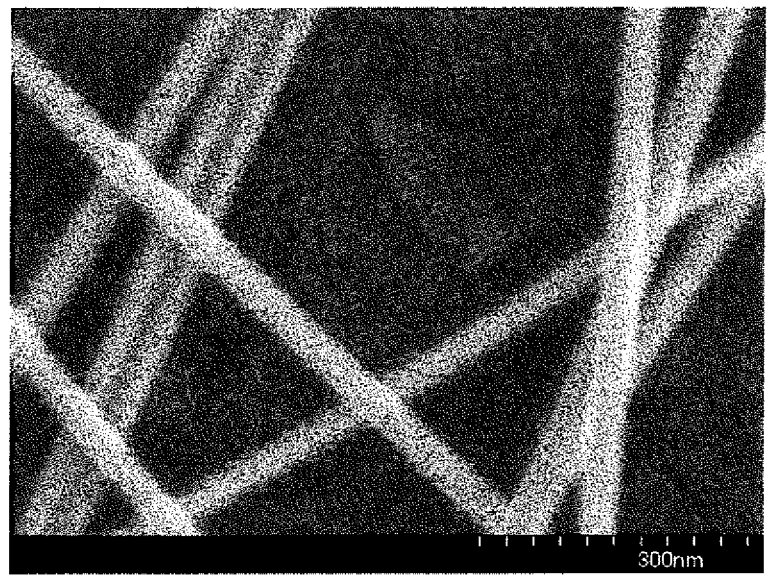
FIG. 7B is the SEM micrograph (high magnification) of the silver nanowires obtained in Example 2.

The entire amount of the solution A was heated from ordinary temperature to 115° C. and then stirred at 300 rpm for 20 minutes. After stirring for 20 minutes, the solution B was added to the solution A at 115° C. with a tube pump over 1 minute, and the mixture was retained at 115° C. for 12 hours while retaining the stirring state, thereby providing a reaction liquid where the deposition reaction of silver had been completed. Thereafter, the rinsing operation was performed in the same manner as in Example 1, thereby providing silver nanowires. FIGS. 7A and 7B exemplify the SEM micrographs of the silver nanowires.

The measurement of the resulting silver nanowires in the same manner as in Example 1 revealed that the average diameter of the silver nanowires was 40 nm, the average length thereof was 12.9 μm, and the average aspect ratio thereof was 12,900 nm/40 nm≈323.

The silver nanowires are covered with the vinylpyrrolidone-methylmaleimide copolymer, and are significantly improved in dispersibility in an aqueous solvent having an alcohol added thereto.

Example 3

Production of Copolymer of Maleimide-Based Monomer and Vinylpyrrolidone

A copolymer was produced under the same conditions as in Example 1 except that in the production of the copolymer in Example 1, the amount of N-ethylmaleimide added was changed from 1.113 g to 0.113 g. The resulting copolymer was a vinylpyrrolidone-ethylmaleimide copolymer having a structure obtained through polymerization of 1.128 parts by mass of the maleimide-based monomer and 100 parts by mass of vinylpyrrolidone, and the charged amounts of the monomers converted to percentage by mass were 1% by mass for ethylmaleimide and 99% by mass for vinylpyrrolidone. As a result of a gel permeation chromatography (GPC) measurement, the weight average molecular weight of the resulting vinylpyrrolidone-ethylmaleimide copolymer was 370,000.

Production of Silver Nanowires

At ordinary temperature, 26 g of propylene glycol (1,2-propanediol) was placed in a 50 mL vial container, to which 0.393 g of the vinylpyrrolidone-ethylmaleimide copolymer obtained above, 0.151 g of a 1,2-propanediol solution having a lithium chloride content of 1% by mass, 0.150 g of a 1,2-propanediol solution having a lithium hydroxide content of 1% by mass, 0.166 g of a 1,2-propanediol solution having a potassium bromide content of 0.25% by mass, and 0.104 g of a 1,2-propanediol solution having an aluminum nitrate nonahydrate content of 2% by mass were added, followed by mixing, so as to provide a solution A. 0.212 g of silver nitrate was dissolved in 2 g of 1,2-propanediol to provide a solution B.

Figure 8:
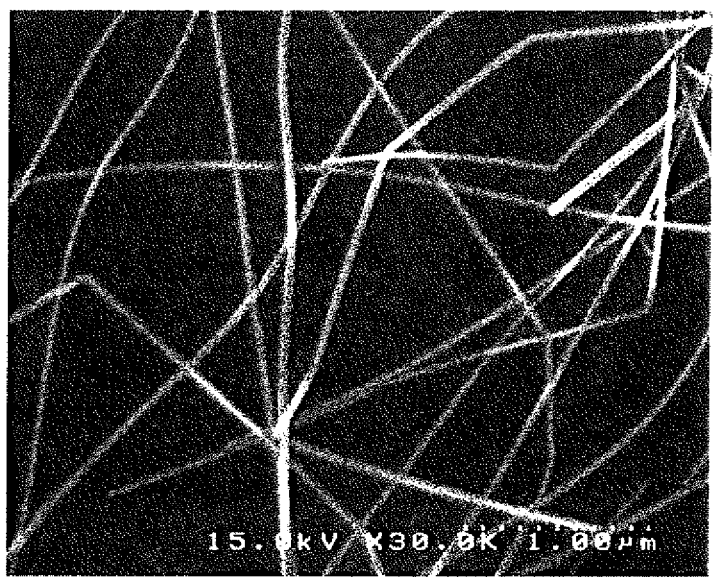
FIG. 8 is the SEM micrograph of the silver nanowires obtained in Example 3.
Figure 9:
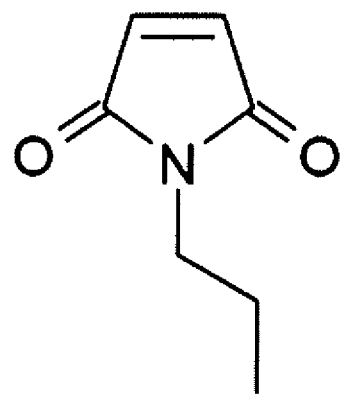
FIG. 9 is a structural formula of N-propylmaleimide.

The entire amount of the solution A was heated from ordinary temperature to 115° C. and then stirred at 300 rpm for 20 minutes. After stirring for 20 minutes, the solution B was added to the solution A at 115° C. with a tube pump over 1 minute, and the mixture was retained at 115° C. for 12 hours while retaining the stirring state, thereby providing a reaction liquid where the deposition reaction of silver had been completed. Thereafter, the rinsing operation was performed in the same manner as in Example 1, thereby providing silver nanowires. FIG. 8 exemplifies the SEM micrograph of the silver nanowires.

The measurement of the resulting silver nanowires in the same manner as in Example 1 revealed that the average diameter of the silver nanowires was 45 nm, the average length thereof was 10.9 μm, and the average aspect ratio thereof was 10,900 nm/45 nm≈242.

The silver nanowires are covered with the vinylpyrrolidone-ethylmaleimide copolymer, and are significantly improved in dispersibility in an aqueous solvent having an alcohol added thereto.

Example 4

Production of Copolymer of Maleimide-Based Monomer and Vinylpyrrolidone

Figure 10:
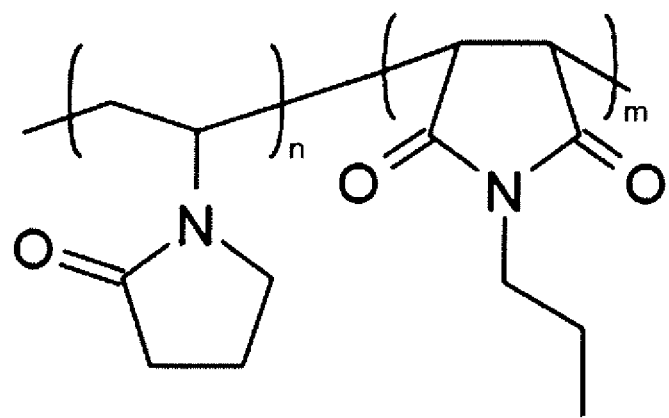
FIG. 10 is a structural formula of a vinylpyrrolidone-propylmaleimide copolymer.

A copolymer was produced under the same conditions as in Example 1 except that in the production of the copolymer in Example 3, N-ethylmaleimide was changed to N-propylmaleimide (molecular weight: 139.15). The resulting copolymer was a vinylpyrrolidone-propylmaleimide copolymer having a structure obtained through polymerization of 1.128 parts by mass of the maleimide-based monomer and 100 parts by mass of vinylpyrrolidone, and the charged amounts of the monomers converted to percentage by mass were 1% by mass for propylmaleimide and 99% by mass for vinylpyrrolidone. FIG. 10 shows the structural formula of the vinylpyrrolidone-propylmaleimide copolymer.

Production of Silver Nanowires

At ordinary temperature, 26 g of propylene glycol (1,2-propanediol) was placed in a 50 mL vial container, to which 0.472 g of the vinylpyrrolidone-propylmaleimide copolymer obtained above, 0.151 g of a 1,2-propanediol solution having a lithium chloride content of 1% by mass, 0.150 g of a 1,2-propanediol solution having a lithium hydroxide content of 1% by mass, 0.185 g of a 1,2-propanediol solution having a potassium bromide content of 0.25% by mass, and 0.104 g of a 1,2-propanediol solution having an aluminum nitrate nonahydrate content of 2% by mass were added, followed by mixing, so as to provide a solution A. 0.212 g of silver nitrate was dissolved in 2 g of 1,2-propanediol to provide a solution B.

Figure 11:
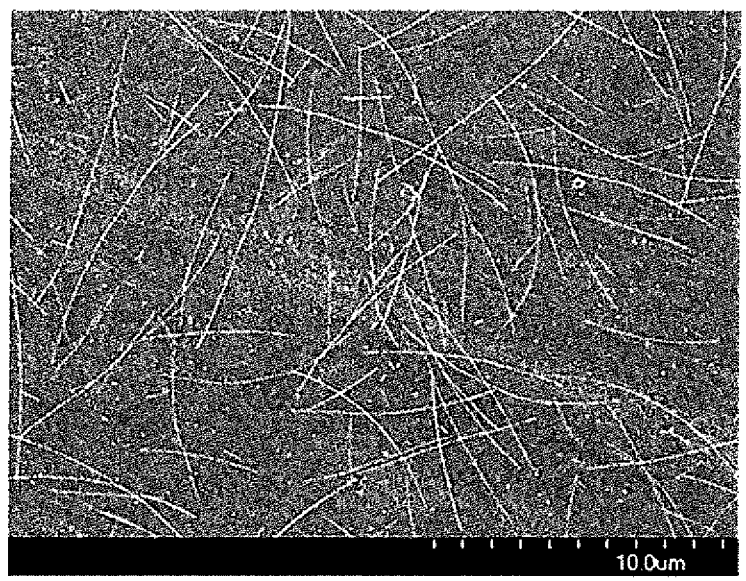
FIG. 11 is the SEM micrograph of the silver nanowires obtained in Example 4.
Figure 12:
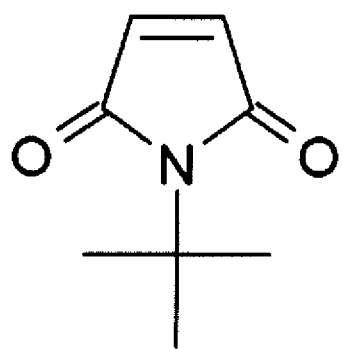
FIG. 12 is a structural formula of N-tert-butylmaleimide.

The entire amount of the solution A was heated from ordinary temperature to 115° C. and then stirred at 300 rpm for 20 minutes. After stirring for 20 minutes, the solution B was added to the solution A at 115° C. with a tube pump over 1 minute, and the mixture was retained at 115° C. for 12 hours while retaining the stirring state, thereby providing a reaction liquid where the deposition reaction of silver had been completed. Thereafter, the rinsing operation was performed in the same manner as in Example 1, thereby providing silver nanowires. FIG. 11 exemplifies the SEM micrograph of the silver nanowires.

The measurement of the resulting silver nanowires in the same manner as in Example 1 revealed that the average diameter of the silver nanowires was 30 nm, the average length thereof was 9.2 µm, and the average aspect ratio thereof was 9,200 nm/30 nm≈307.

The silver nanowires are covered with the vinylpyrrolidone-propylmaleimide copolymer, and are significantly improved in dispersibility in an aqueous solvent having an alcohol added thereto.

Example 5

Production of Copolymer of Maleimide-Based Monomer and Vinylpyrrolidone

Figure 13:
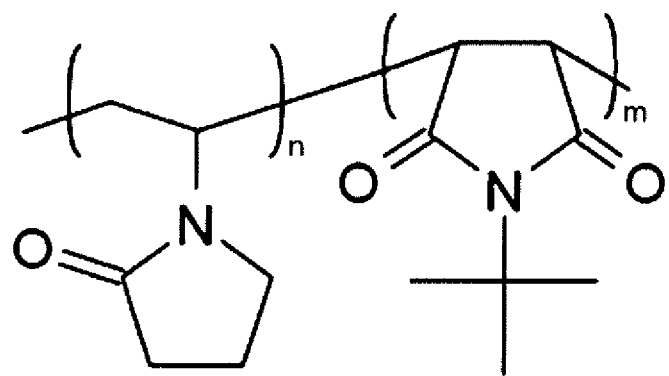
FIG. 13 is a structural formula of a vinylpyrrolidone-tert-butylmaleimide copolymer.

A copolymer was produced under the same conditions as in Example 1 except that in the production of the copolymer in Example 3, N-ethylmaleimide was changed to N-tert-butylmaleimide (molecular weight: 153.18). The resulting copolymer was a vinylpyrrolidone-butylmaleimide copolymer having a structure obtained through polymerization of 1.128 parts by mass of the maleimide-based monomer and 100 parts by mass of vinylpyrrolidone, and the charged amounts of the monomers converted to percentage by mass were 1% by mass for butylmaleimide and 99% by mass for vinylpyrrolidone. FIG. 13 shows the structural formula of the vinylpyrrolidone-tert-butylmaleimide copolymer.

Production of Silver Nanowires

At ordinary temperature, 26 g of propylene glycol (1,2-propanediol) was placed in a 50 ml, vial container, to which 0.402 g of the vinylpyrrolidone-butylmaleimide copolymer obtained above, 0.151 g of a 1,2-propanediol solution having a lithium chloride content of 1% by mass, 0.195 g of a 1,2-propanediol solution having a lithium hydroxide content of 1% by mass, 0.166 g of a 1,2-propanediol solution having a potassium bromide content of 0.25% by mass, and 0.104 g of a 1,2-propanediol solution having an aluminum nitrate nonahydrate content of 2% by mass were added, followed by mixing, so as to provide a solution A. 0.212 g of silver nitrate was dissolved in 2 g of 1,2-propanediol to provide a solution B.

Figure 14:
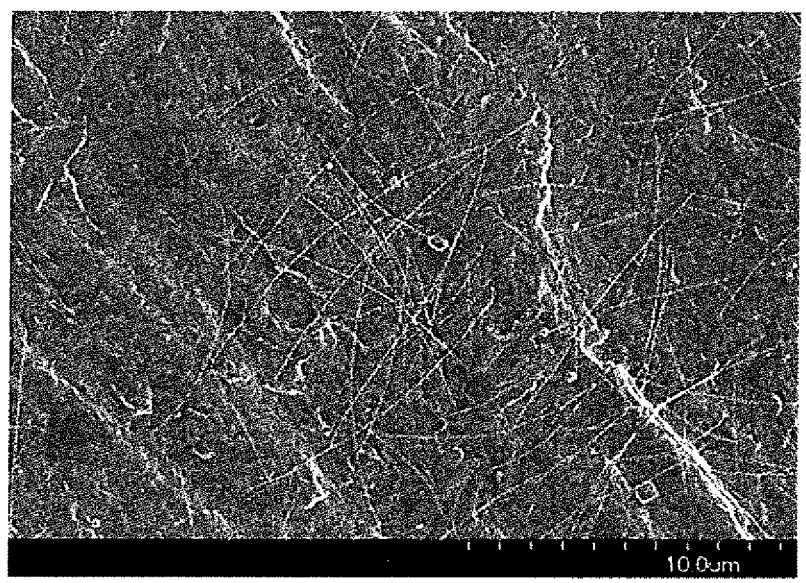
FIG. 14 is the SEM micrograph of the silver nanowires obtained in Example 5.
Figure 15:
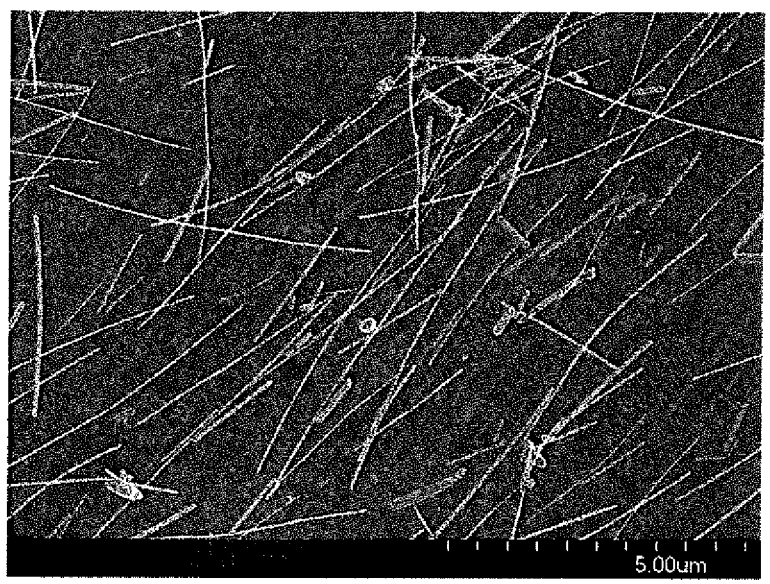
FIG. 15 is the SEM micrograph of the silver nanowires obtained in Comparative Example 1.
Figure 16:
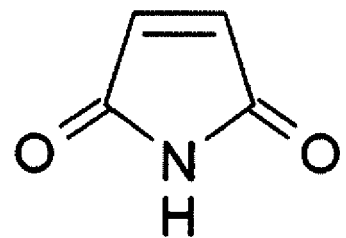
FIG. 16 is a structural formula of maleimide.

The entire amount of the solution A was heated from ordinary temperature to 115° C. and then stirred at 300 rpm for 20 minutes. After stirring for 20 minutes, the solution B was added to the solution A at 115° C. with a tube pump over 1 minute, and the mixture was retained at 115° C. for 12 hours while retaining the stirring state, thereby providing a reaction liquid where the deposition reaction of silver had been completed. Thereafter, the rinsing operation was performed in the same manner as in Example 1, thereby providing silver nanowires. FIG. 14 exemplifies the SEM micrograph of the silver nanowires.

The measurement of the resulting silver nanowires in the same manner as in Example 1 revealed that the average diameter of the silver nanowires was 33 nm, the average length thereof was 10.3 µm, and the average aspect ratio thereof was 10,300 nm/33 nm≈312.

The silver nanowires are covered with the vinylpyrrolidone-butylmaleimide copolymer, and are significantly improved in dispersibility in an aqueous solvent having an alcohol added thereto.

Comparative Example 1

As an organic protective agent, a commercially available alkylated PVP (Antaron V-904LC, produced by ISP Chemicals, Inc.) was used, which was a copolymer of vinylpyrrolidone and 10% by mass alkyl-added vinylpyrrolidone.

Production of Silver Nanowires

At ordinary temperature, 20.8 g of propylene glycol (1,2-propanediol) was placed in a 50 ml, vial container, to which 0.56 g of the alkylated PVP above, 0.14 g of a 1,2-propanediol solution having a lithium chloride content of 0.5% by mass, 0.150 g of a 1,2-propanediol solution having a lithium hydroxide content of 1% by mass, and 0.14 g of a 1,2-propanediol solution having an aluminum nitrate nonahydrate content of 2% by mass were added, followed by mixing, so as to provide a solution A. 0.17 g of silver nitrate was dissolved in 2 g of 1,2-propanediol to provide a solution B.

The entire amount of the solution A was heated from ordinary temperature to 115° C. and then stirred at 300 rpm for 20 minutes. After stirring for 20 minutes, the solution B was added to the solution A at 115° C. with a tube pump over 1 minute, and the mixture was retained at 115° C. for 12 hours while retaining the stirring state, thereby providing a reaction liquid where the deposition reaction of silver had been completed. Thereafter, the rinsing operation was performed in the same manner as in Example 1, thereby providing silver nanowires. FIG. 8 exemplifies the SEM micrograph of the silver nanowires.

The measurement of the resulting silver nanowires in the same manner as in Example 1 revealed that the average diameter of the silver nanowires was 75 nm, the average length thereof was 3.7 µm, and the average aspect ratio thereof was 3,700 nm/75 nm≈49. The silver nanowires are covered with the alkylated PVP, and are improved in dispersibility in an aqueous solvent having an alcohol added thereto, but wires having a long shape are difficult to synthesize with this type of an organic protective agent.

The invention claimed is:

1. Silver nanowires having an average diameter of 100 nm or less and an average length of 5 µm or more, covered with a copolymer of a maleimide-based monomer and vinylpyrrolidone.

2. The silver nanowires according to claim 1, wherein the silver nanowires have an average diameter of 50 nm or less and an average length of 10 µm or more.

3. The silver nanowires according to claim 1, wherein the maleimide-based monomer has a molecular weight of from 97 to 300.

4. The silver nanowires according to claim 1, wherein the maleimide-based monomer is N-methylmaleimide.

5. The silver nanowires according to claim 1, wherein the maleimide-based monomer is N-ethylmaleimide.

6. The silver nanowires according to claim 1, wherein the maleimide-based monomer is maleimide.

7. The silver nanowires according to claim 1, wherein the maleimide-based monomer is N-propylmaleimide.

8. The silver nanowires according to claim 1, wherein the maleimide-based monomer is N-tert-butylmaleimide.

9. A silver nanowires ink comprising the silver nanowires according to claim 1 in an amount of from 0.02 to 5.0% by mass in a liquid medium.

10. A method for producing silver nanowires, comprising:
reductively depositing silver in a wire form in an alcohol solvent having dissolved therein a silver compound, the deposition being performed in the solvent having dissolved therein a copolymer of a maleimide-based monomer and vinylpyrrolidone.

11. The method for producing silver nanowires according to claim 10, wherein the maleimide-based monomer has a molecular weight of from 97 to 300.

12. The method for producing silver nanowires according to claim 10, wherein the maleimide-based monomer is N-methylmaleimide.

13. The method for producing silver nanowires according to claim 10, wherein the maleimide-based monomer is N-ethylmaleimide.

14. The method for producing silver nanowires according to claim 10, wherein the maleimide-based monomer is maleimide.

15. The method for producing silver nanowires according to claim 10, wherein the maleimide-based monomer is N-propylmaleimide.

16. The method for producing according to claim 10, wherein the maleimide-based monomer is N-tert-butylmaleimide.

17. The method for producing silver nanowires according to claim 10, wherein the copolymer of a maleimide-based monomer and vinylpyrrolidone has a structure containing from 0.1 to 25 parts by mass of the maleimide-based monomer and 100 parts by mass of vinylpyrrolidone polymerized, wherein the copolymer is previously polymerized before adding the copolymer for the reductive deposition of silver nanowires.

18. The method for producing silver nanowires according to claim 10, wherein the alcohol solvent is a polyol.

19. The method for producing silver nanowires according to claim 10, wherein the reduction deposition of silver is performed in a temperature range of 60° C. or more and below boiling point of the solvent alcohol used.

20. A method for producing silver nanowires, comprising:
reductively depositing silver in a wire form in an alcohol solvent having dissolved therein a silver compound, the deposition being performed in the solvent having dissolved therein a copolymer of a maleimide-based monomer and vinylpyrrolidone, a chloride, a bromide, an alkali metal hydroxide, and an aluminum salt.

21. The method for producing silver nanowires according to claim 20, wherein the maleimide-based monomer has a molecular weight of from 97 to 300.

22. The method for producing silver nanowires according to claim 20, wherein the maleimide-based monomer is N-methylmaleimide.

23. The method for producing silver nanowires according to claim 20, wherein the maleimide-based monomer is N-ethylmaleimide.

24. The method for producing silver nanowires according to claim 20, wherein the maleimide-based monomer is maleimide.

25. The method for producing silver nanowires according to claim 20, wherein the maleimide-based monomer is N-propylmaleimide.

26. The method for producing silver nanowires according to claim 20, wherein the maleimide-based monomer is N-tert-butylmaleimide.

27. The method for producing silver nanowires according to claim 20, wherein the copolymer of a maleimide-based monomer and vinylpyrrolidone has a structure containing from 0.1 to 25 parts by mass of the maleimide-based monomer and 100 parts by mass of vinylpyrrolidone polymerized, wherein the copolymer is previously polymerized before adding the copolymer for the reductive deposition of silver nanowires.

28. The method for producing silver nanowires according to claim 20, wherein the alcohol solvent is a polyol.

29. The method for producing silver nanowires according to claim 20, wherein the reduction deposition of silver is performed in a temperature range of 60° C. or more and below boiling point of the solvent alcohol used.

* * * * *